Feb. 14, 1933.    L. A. HOLMAN    1,897,477
FRAMING PLATE HOLDER FOR MOTION PICTURE PROJECTORS
Filed Nov. 7, 1929
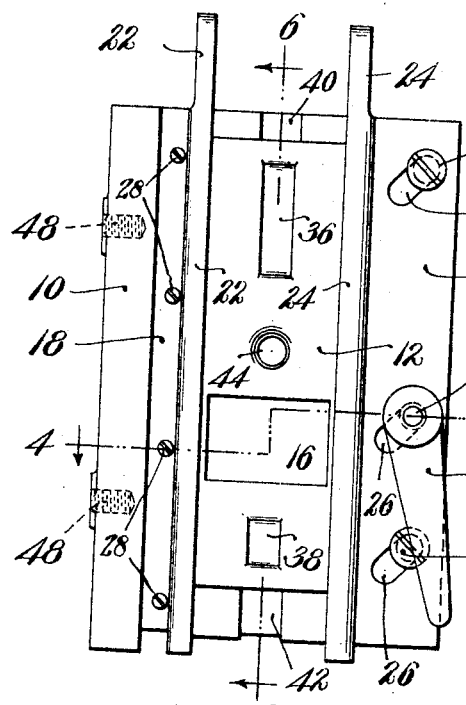
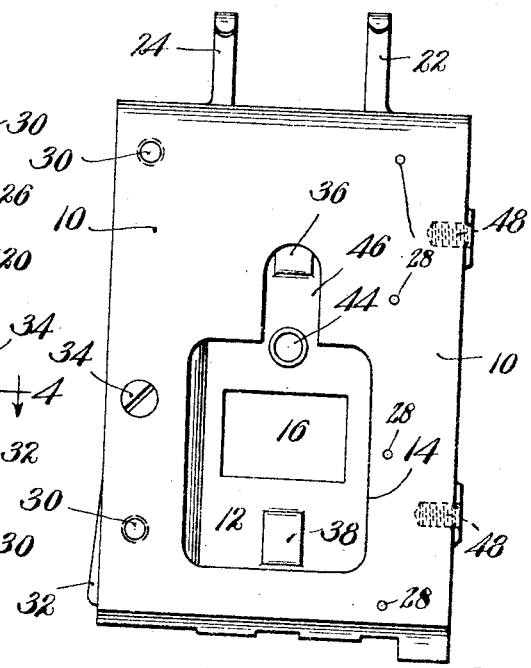
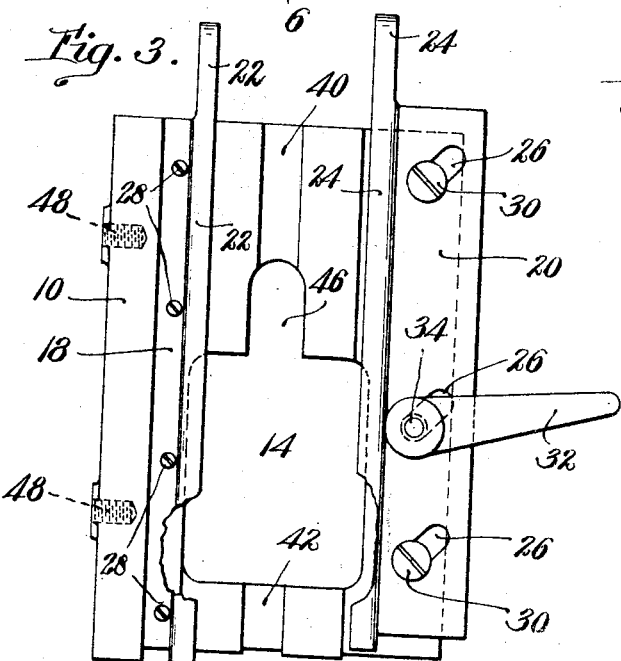
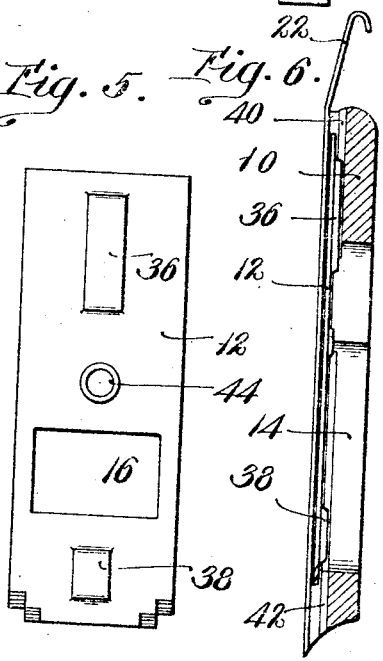
Inventor
Leslie A. Holman
by Francis N. Darin
Atty.

Patented Feb. 14, 1933

1,897,477

UNITED STATES PATENT OFFICE

LESLIE A. HOLMAN, OF WALTHAM, MASSACHUSETTS

FRAMING PLATE HOLDER FOR MOTION PICTURE PROJECTORS

Application filed November 7, 1929. Serial No. 405,424.

This invention relates to holders for framing plates for use in motion picture projectors and more particularly to a holder of that character so constructed as to permit and to facilitate the rapid change of framing plates therein.

In the projection of motion pictures upon a screen, it is necessary that the projection machine be provided with means for outlining or framing the picture upon the screen and this has been accomplished by the use of a framing plate having an aperture of the desired size, which plate is mounted in a holder adjacent the film. Until recently, a framing plate having a standard sized aperture fulfilled all conditions of use and consequently the framing plate holders of projection machines have not been constructed to facilitate a change in framing plates.

The development, however, of the talking pictures has changed conditions in this respect because the addition of the sound track on the side of such films slightly restricts the width of the picture, and in order to make the picture on the screen of the right proportions in width and height the aperture in the framing plate must be reduced somewhat in both dimensions. Another evolution which has affected the size of the aperture in the framing plate has been the magnascopic lens which tends to spread the rays over a larger area so that a screen may be used filling up the proscenium arch or opening in the theatre. The proscenium arch or opening varies in area in different theatres and the aperture in the framing plate in each case should correspond with the particular proscenium opening.

These improvements require frequent changing of framing plates in the projection machines and many theatres are greatly handicapped by the fact that the present forms of such machines are not well adapted for such changes. The change from a silent film to a talking film or vice versa calls for a screen picture of different size and the same is true when the magnascopic lens is thrown into or out of operation which sometimes happens one or more times in the same film.

The main object of my invention is the provision of a framing plate holder so constructed as to permit of a rapid change of framing plates therein so that the size of the picture upon the screen may be varied to suit any conditions.

Another object of the invention is the provision of a holder which is adapted for use in projection machines of any construction.

A further object is the provision of a holder of simple construction, efficient in operation, and of low cost.

Other objects of the invention will be more specifically set forth and described hereinafter.

In the drawing illustrating one form of my invention, Figure 1 is a front elevation of a holder and framing plate mounted therein constructed and adapted to be operated in accordance with my invention; Fig. 2 is a rear elevation of the same; Fig. 3 is a front elevation of the holder with the framing plate removed and certain portions cut away; Fig. 4 is a cross sectional view on line 4—4 in Fig. 1 looking downwardly; Fig. 5 is a rear elevation of a framing plate; and Fig. 6 is a vertical central sectional view on line 6—6 in Fig. 1 looking from right to left.

Referring to the drawing showing, for the purpose of illustrating the invention, one form thereof, 10 indicates a holder and 12 a framing plate mounted therein. The holder 10 may be of any suitable form but as shown is a relatively thick rectangular plate having a relatively large aperture 14 substantially rectangular located in the lower portion thereof. As shown, the framing plate 12 is a thin elongated rectangular plate provided with an opening 16 in its lower portion for framing the picture on the screen which opening registers with the opening 14 when the framing plate is mounted in the holder.

For holding the framing plate in position, a pair of retaining members 18 and 20 are mounted in spaced apart relation on the holder, which retaining members may be of any suitable form but as shown each comprises an elongated flat strip having formed on one longitudinal edge an offset flange. The flanges 22 and 24 respectively of the two members are alike in form but the strip portion of the member 20 is relatively wider than the corresponding portion of the member 18 in order to permit a plurality of oblique slots 26 to be formed therein.

The member 18 is fixed to the front face of the holder by screws 28 and the member 20 is mounted loosely on two headed screws or studs 30 set through two of the slots 26 into said front face which is cut away to receive the strip portions of said retaining members. Being loosely mounted on the screws 30 the member 20 is movable in an oblique direction upwardly and parallel to the long axes of the slots 26 but is held in a downward operative position by gravity.

The flanges 22 and 24 in addition to retaining the framing plate in position also serve as tracks over which the film moves in close relation to the framing plate which is necessary to avoid blurring the outline of the picture on the screen and for that reason the flanges are extended above the top of the holder 10 and their extended ends are bent away from the film (Fig. 6) to avoid any danger of the ends catching in the sprocket holes in the film.

For locking the movable retaining member 20 in any desired position any suitable means may be provided and one such is shown comprising an arm 32 threaded at one end on a screw 34 inserted from the back face of the holder which projects out through the centre slot 26. In Fig. 1 the arm 32 is shown in position for locking the retaining member 20 but by turning it upwardly to the position shown in Fig. 3, the arm is unscrewed on the screw 34 sufficiently to release the retaining member so that it may be freely moved as far as the slots 26 permit.

The framing plate on its rear side is provided with a pair of inwardly pressed guiding projections 36 and 38 having sheared side edges for engaging channels 40 and 42 respectively in the front face of the holder 10 which projections prevent lateral movement of the framing plate on the holder. To lock the framing plate in proper vertical position it may be provided with an opening 44 adapted to lock over a circular stud (not shown) projecting through a slot 46 in the holder when the holder is secured in position upon a fixed part of the projecting machine such as the lens head.

The holder may be secured in the projecting machine by any suitable means but is shown provided with a pair of threaded holes 48 in one side for receiving screws for fastening it to a fixed part of the machine.

In its operation in use, the holder of my invention is extremely simple. With a framing plate locked therein, the parts are in the positions shown in Figure 1. To remove the framing plate, the arm 32 is turned upwardly into the position shown in Fig. 3 which releases the retaining member 20 and it may then be moved outwardly and upwardly to the position illustrated in said Fig. 3 which permits the framing plate to be removed and another plate inserted. The retaining member may be held by the hand in its upper position while the plates are being changed or it may be locked in that position by turning the arm 32 downwardly. In either event, after the change has been made and the retaining member released either from the hand or by turning up the arm 32, it will drop by gravity into operative locking position when it may be locked by turning down the arm 32.

It will be observed that the operation of changing framing plates in a holder made in accordance with my invention can be accomplished very rapidly and in a few seconds which is a consideration of great importance in the use of projecting machines under present day conditions. This change may also be made without interfering with the film except to move it slightly away from the tracks to permit a plate to be removed from or inserted in the holder.

It is to be understood that the form herein shown and described is merely to illustrate one application of my invention which may be embodied in various other forms within the scope of the following claims.

What I claim is:

1. A framing plate holder for projecting machines having in combination, a rectangular plate having a relatively large aperture, a pair of plate retaining members mounted on said plate in vertical separated position, one of which is movable to permit a framing plate to be mounted on or removed from said holder and an arm for locking said movable plate in any desired position; said members having smooth longitudinal portions adapted to serve as tracks for a film.

2. A framing plate holder for projecting machines having in combination, a rectangular plate having a relatively large aperture, a pair of plate retaining members mounted on said plate in vertical separated position, one of which is movable to permit a framing plate to be mounted on or removed from said holder and an arm pivotally mounted at one end on a screw for locking said movable plate in any desired position; said members having smooth longitudinal portions adapted to serve as tracks for a film and having their upper ends extended and bent rearwardly to avoid catching in the sprocket holes in the film.

3. A framing plate holder for projecting machines having in combination, a rectangular plate having a relatively large aperture, a framing plate mounted thereon and having an aperture registering with the aperture in said rectangular plate and a pair of flanged retaining members for holding said framing plate against lateral movement, one of which is fixed and the other being provided with a plurality of oblique slots and being movably mounted upon screw studs projecting through said slots and means for locking said movable member in any desired position; said rectangular plate and said framing plate having interlocking means for centralizing said framing plate.

4. In a motion picture projecting machine, the combination of a holder plate having a relatively large aperture and fastened to a fixed part of the machine in position for the film to travel over its front face, a framing plate provided with an opening for framing the picture on the screen, said opening registering in the opening in said holder plate and a pair of vertical separated flanged retaining members for holding said framing plate against lateral movement, one of said members being fastened to said holder plate and the other being movable on said holder plate in order to permit the framing plate to be mounted on and removed therefrom.

5. In a motion picture projecting machine, the combination of a holder plate having a relatively large aperture and fastened to a fixed part of the machine in position for the film to travel over its front face, a framing plate provided with an opening for framing the picture on the screen, said opening registering in the opening in said holder plate and a pair of vertical separated flanged retaining members for holding said framing plate against lateral movement, one of said members being fastened to said holder plate and the other being movable on said holder plate in order to permit the framing plate to be mounted on and removed therefrom, the flanges of said retaining members having smooth surfaces to serve as tracks for the edges of the film.

6. In a motion picture projecting machine, the combination of a holder plate having a relatively large aperture and fastened to a fixed part of the machine in position for the film to travel over its front face, a framing plate provided with an opening for framing the picture on the screen, said opening registering in the opening in said holder plate, a pair of vertical separated flanged retaining members for holding said framing plate against lateral movement, one of said members being fastened on said holder plate and the other of said members being provided with a plurality of oblique slots and being movably mounted on screw studs projecting through said slots and means for locking said movable member in any desired position.

7. A framing plate holder for projecting machines comprising a rectangular plate having a relatively large aperture, a framing plate mounted thereon and having an aperture registering with the aperture in said rectangular plate, a pair of flanged retaining members mounted on said rectangular plate in parallel separated relation, one of said members being fixed and the other being movable to permit said framing plate to be mounted on or removed from said rectangular plate, means for locking said movable member in any desired position and means on said rectangular and framing plates adapted to interlock to centralize said framing plate.

In witness whereof, I hereunto set my hand this fifth day of November, 1929.

LESLIE A. HOLMAN.